United States Patent [19]

Wolff et al.

[11] Patent Number: 5,232,676
[45] Date of Patent: Aug. 3, 1993

[54] PROCESS FOR THE BIOLOGICAL PURIFICATION OF WASTE AIR STREAMS

[75] Inventors: Felix Wolff; Thomas Melin, both of Cologne, Fed. Rep. of Germany

[73] Assignee: Bayer Aktiengesellschaft, Leverkusen, Fed. Rep. of Germany

[21] Appl. No.: 941,769

[22] Filed: Sep. 4, 1992

Related U.S. Application Data

[63] Continuation of Ser. No. 740,275, Aug. 5, 1991, abandoned.

[30] Foreign Application Priority Data

Aug. 10, 1990 [DE] Fed. Rep. of Germany ....... 4025343

[51] Int. Cl.$^5$ .............................................. B01D 53/00
[52] U.S. Cl. .......................... 423/210; 423/DIG. 17; 55/90; 55/97; 210/615
[58] Field of Search ............. 55/90, 97; 210/615; 423/DIG. 17, 210

[56] References Cited

U.S. PATENT DOCUMENTS

| | | | |
|---|---|---|---|
| 3,665,677 | 5/1972 | Koch | 55/56 |
| 4,385,988 | 5/1983 | Hyppönen | 210/150 |
| 4,443,337 | 4/1984 | Otani et al. | 210/602 |
| 4,662,900 | 5/1987 | Ottengraf | 55/90 |
| 4,869,824 | 9/1989 | Melin et al. | 210/615 |
| 5,085,766 | 2/1992 | Born | 210/150 |
| 5,089,137 | 2/1992 | McKown | 210/615 |
| 5,116,506 | 5/1992 | Williamson et al. | 210/610 |
| 5,123,936 | 6/1992 | Stone et al. | 55/8 |

FOREIGN PATENT DOCUMENTS 3641442 6/1988 Fed. Rep. of Germany.

Primary Examiner—Gary P. Straub
Assistant Examiner—Timothy C. Vanoy
Attorney, Agent, or Firm—Sprung Horn Kramer & Woods

[57] ABSTRACT

In a process for the biological elimination of halogen- and sulfur-containing gaseous pollutants from a waste air stream, the waste air stream is passed through an intermittently moistened trickling filter tower. In a preferred variant of the process, individual sections of the surface of the trickling filter are subjected to intermittent phase-displaced moistening. Cyclic moistening of the trickling filter sections can be achieved in this way. The volume-time yield in the biological purification of gas streams can be considerably improved by this process.

7 Claims, 5 Drawing Sheets

PROCESS FOR THE BIOLOGICAL PURIFICATION OF WASTE AIR STREAMS

This application is a continuation of application Ser. No. 07/740,275, filed Aug. 5, 1991, now abandoned.

BACKGROUND OF THE INVENTION

This invention relates to a biological process for the purification of waste air streams laden with sparingly water-soluble substances of which the biological degradation is accompanied by the formation of acids.

The biowasher process is known from the literature. In this process, the organic impurities are washed out from the waste air stream in an absorber and the washing liquid is biologically purified in an activated sludge tank. The purified liquid is then recirculated into the absorber and re-charged. However, the uptake capacity of the liquid for the substances mentioned above is so small that the recirculation stream between the two units becomes so large that the process cannot be used for economic reasons.

U.S. Pat. No. 0 249 861 A2 describes a process in which the absorber and the activated sludge reactor are integrated into a a single apparatus, a plate column. Compared with the spray or jet washer, the scope of application is distinctly broader. However, since the necessary number of stages and hence the pressure loss decrease with decreasing solubility of the waste air ingredients in water, there are also limits to this process.

In another biowasher process (DE 3 641 442 A1), silicone oil is added to the washing liquid so that the liquid is able to absorb more organic substances. However, removal of the salts formed is problematical. In addition, silicone oil is always discharged with the salt and has to be replaced.

The biofilter process is unsuitable for the elimination of substances of which the degradation is accompanied by the formation of HCl or $H_2SO_4$ because the biofilm acidifies so that the degradation activity of the microorganisms comes to a standstill.

The trickling filter process is mentioned in VDI Richtlinie 3478. In contrast to the biowasher process, the microorganisms are immobilized in the trickling filter process. The gas is passed through a packing in which the mass transfer of the organic constituents and the oxygen takes place. In addition, a liquid stream is passed over the packing, neutralizing the $H^+$ ions, removing the salt accumulating and supplying the bacteria with nutrient salts. Through the immobilization of the microorganisms, salts can be removed without any loss of bacteria. Hitherto, trickling filters have mainly been used for odor elimination.

Neutralization of the acids formed during the degradation of A and Cl compounds is difficult on account of the limited pH range in which microorganisms are viable and the uneven flow through packings. If too little liquid is distributed through the packing, the biofilm acidifies and the degradation activity of the organisms is reduced. However, if the sprinkling density is too high, the liquid preferentially blocks channels in which there are large quantities of biomass. These organisms then take no further part in elimination of the waste air ingredients so that degradation performance deteriorates.

SUMMARY OF THE INVENTION

The problem addressed by the present invention was to ensure that the pH value in the biofilm would not fall excessively and the liquid stream would not block the channels of the trickling filter.

According to the invention, the solution to this problem is characterized in that the trickling filter is intermittently moistened. The trickling filter is preferably sprayed with a liquid for 20 s to 3 mins. 2 to 10 times per hour. A buffered nutrient salt solution is advantageously used as the liquid.

In another embodiment of the process according to the invention, the frequency of the moistening cycles is regulated in dependence upon the pH value of the solution flowing off from the trickling filter. In this case, therefore, an optimal moistening frequency is established in dependence upon the pH value.

In one advantageous embodiment, the process according to the invention is carried out by intermittent phase-displaced moistening of various parts of a trickling filter.

In another embodiment, several trickling filter units subjected to intermittent phase-displaced moistening may be arranged in tandem or parallel.

The process according to the invention affords the following advantages:

In the elimination of halogen- or sulfur-containing gaseous pollutants from a waste air stream, the volume-time yield can be increased by a factor of three to four compared with known processes. Accordingly, with large volumetric gas flows, as for example in room extraction systems, the saving of time and costs is considerable.

The additional investment costs compared with conventional biological waste air purification are relatively low. The process according to the invention can also be carried out in existing plants with relatively little outlay on additional equipment.

The phase-displaced moistening of the partial surfaces has the advantage that the deterioration in elimination performance in the part being sprayed does not significantly affect the elimination performance of the plant as a whole.

Embodiments of the invention are described in detail in the following with reference to the accompanying drawings, wherein:

DETAILED DESCRIPTION OF THE INVENTION

Figure 1:
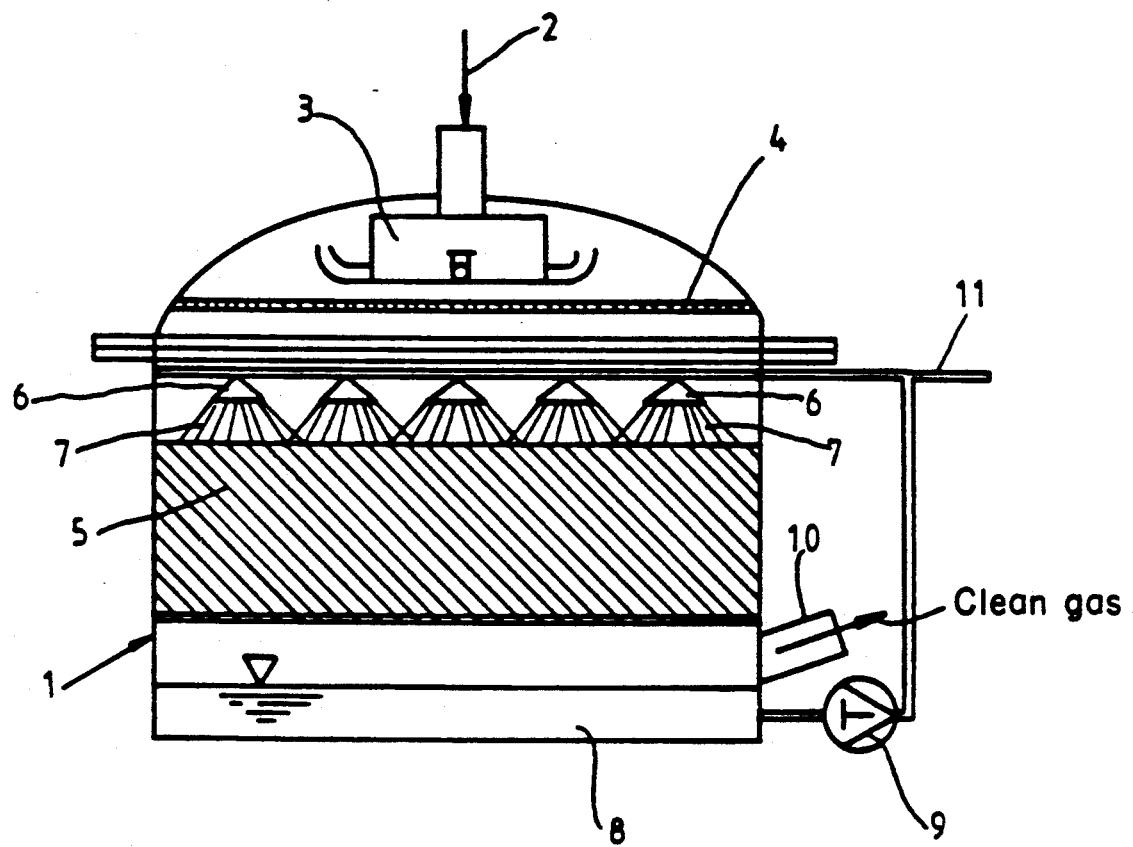
FIG. 1 shows a trickling filter tower for carrying out the process according to the invention.

In the trickling filter tower 1 shown in FIG. 1, the waste gas 2 to be purified is introduced at the upper end and distributed uniformly over the cross-section by a gas distributor 3. A perforated plate 4 is arranged beneath the gas distributor 3 for further uniform distribution. The key component of the trickling filter tower 1 is the trickling filter 5 which consists of crosslinked polyurethane foam having a specific surface of 500 $m^2/m^3$. The microorganisms required for purification of the waste air are immobilized on the foam. The trickling filter 5 is moistened by a series of spray nozzles 6 arranged in parallel (spray cones 7). The liquid then trickles through the trickling filter 5 and collects in the sump 8 at the bottom of the trickling filter tower 1. The liquid in the sump 8 is recirculated to the spray nozzles 6 by a pump 9. The purified gas issues through the pipe 10. Fresh liquid or a nutrient salt solution can be introduced through the connection 11 on the liquid circuit.

The pump 9 does not operate continuously, but rather intermittently under the power of a timed motor. The duration and frequency of the moistening cycles, i.e. the spray cycles, depends upon the nature and degree of the gas pollution. Experience has shown that good separation results are obtained when the trickling filter is sprayed with liquid for 20 s to 3 mins. (cycle time) 1 to 5 times per hour (frequency).

With substances of which the biological degradation is accompanied by the formation of acid, the time between two spraying cycles and hence the spraying frequency is determined by the degree of acidification. With other substances, for example toluene or acetone, the trickling filter has to be sprayed when the microorganisms are no longer sufficiently supplied with nutrients.

The following substance-specific optimal spraying cycles were empirically determined:

| Substance | Concentration [mg/m$^3$] | Cycle time | Frequency |
| --- | --- | --- | --- |
| Methylene chloride | <400 | 2 Mins. | 3 Times/h |
| Methylene chloride | <400 | 2 Mins. | 4 Times/h |
| Toluene | <1,000 | 30 s. | 2 Times/h |
| " | >1,000 | 30 s. | 2 Times/h |
| Acetone and toluene | | | |

Figure 2:
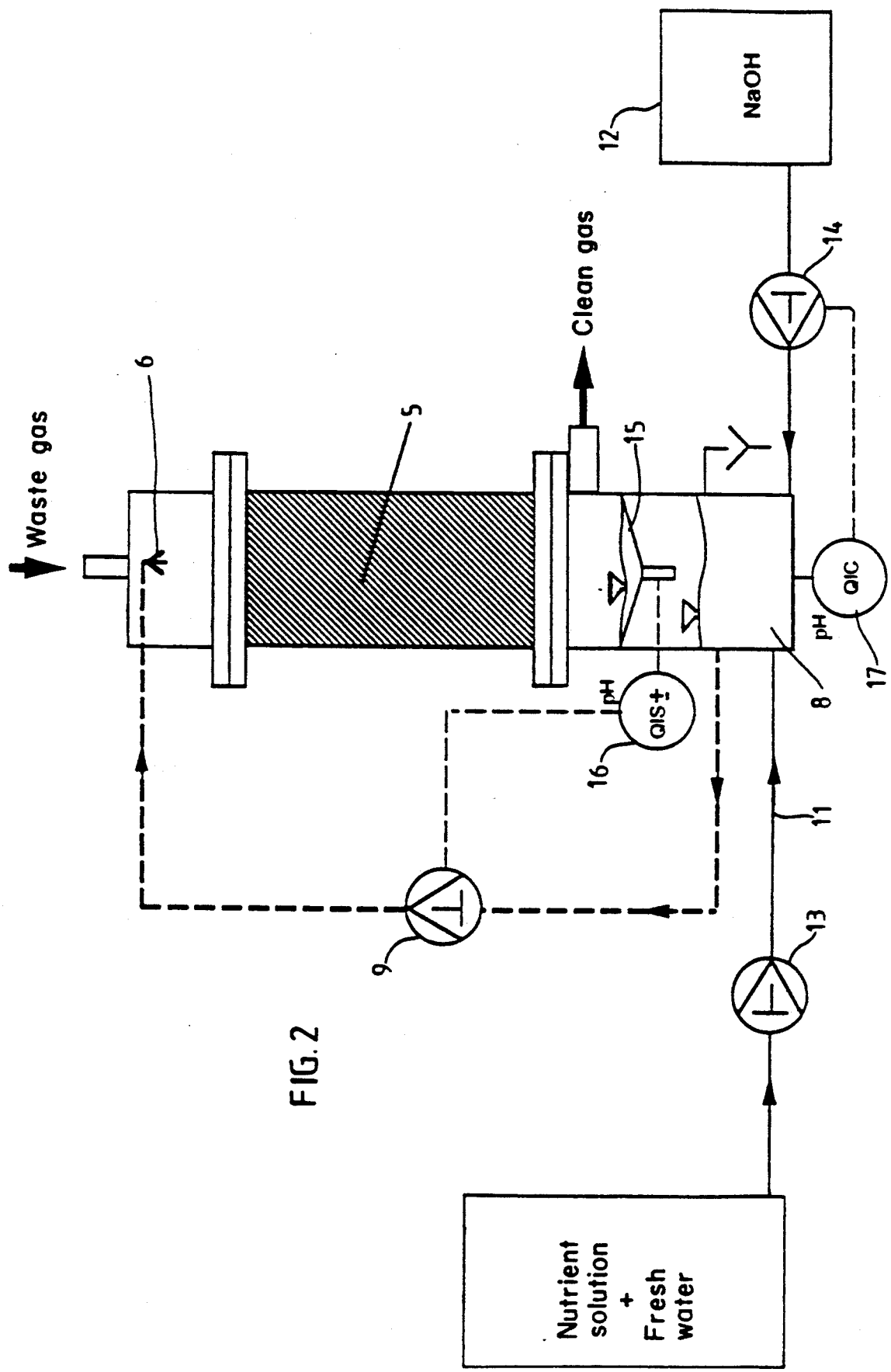
FIG. 2 is a flow chart of the process with its regulated moistening cycle.

With chlorinated hydrocarbons or substances of which the degradation is accompanied by the release of $H^+$ ions or $OH^-$ ions, it is of advantage to regulate the moistening frequency through the pH value. A corresponding flow chart is shown in FIG. 2. A nutrient salt solution buffered with sodium hydroxide is used as the spray liquid. The nutrient solution is stored in a tank 11 while the sodium hydroxide is stored in a tank 12. The nutrient solution is fed to the column sump by means of the pump 13. The measurement signal of a pH measuring station on the sump of the column is fed to a controller 17. The controller 17 controls the pump 14 so that a constant pH value prevails in the sump of the column.

As already explained with reference to FIG. 1, the circulation pump 9 pumps the liquid from the sump 8 to the spray nozzles 6. Another pH measuring station is present at the outlet 15 of the trickling filter. The pH signal is delivered to a controller 16 which controls the pump in such a way that a new spraying cycle is initiated when the pH value of the liquid running down from the trickling filter 5 falls below a predetermined value. In this case, the control system ensures that the moistening frequency and, optionally, the cycle time are automatically adjusted.

Irrespective of the described control through the pH value, the frequency of the spray cycles can also be controlled through the values for the total carbon content of the clean gas (10) issuing from the plant. The total carbon content can be measured by a flame ionization detector (FID). In this method of control, the spraying frequency is best increased when the elimination performance (difference between input and output) falls below a predetermined value.

Figure 3:
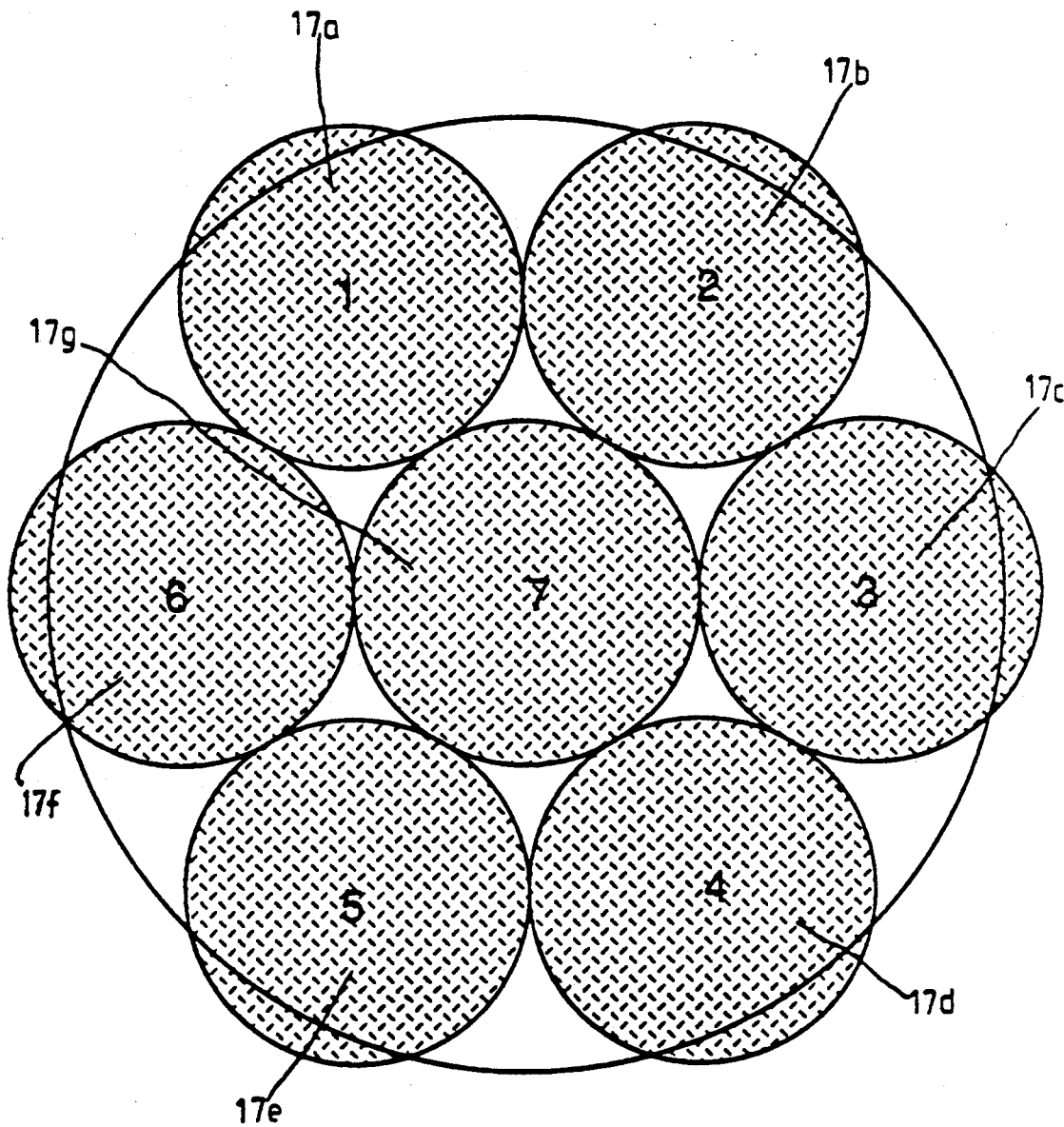
FIG. 3 is a cross-section through a trickling filter with circularly sprayed partial sections.
Figure 4:
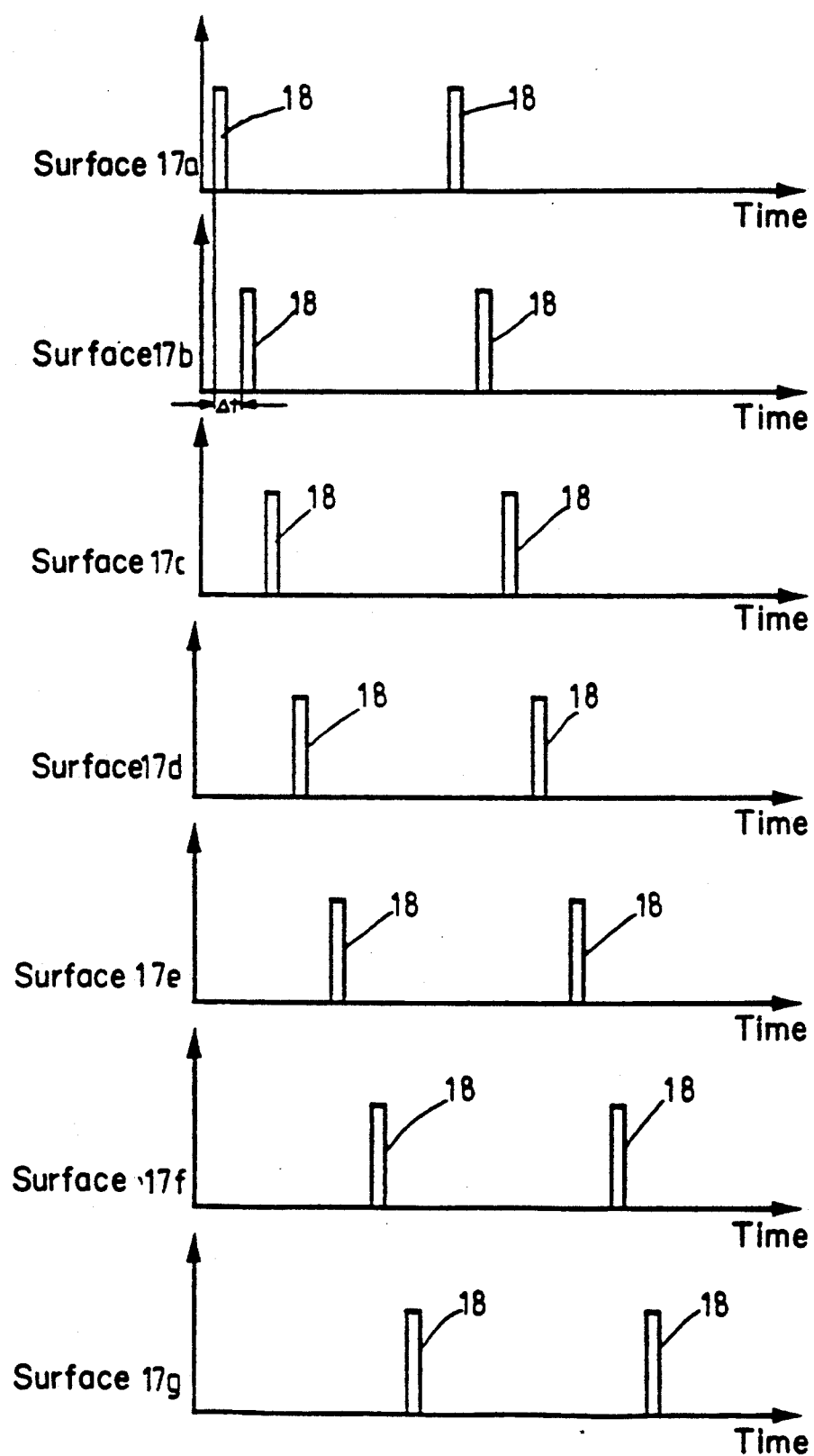
FIG. 4 is a diagram explaining the phase-displaced intermittent moistening of the trickling filter sections shown in FIG. 3.

A further development of the process is described in the following with reference to FIGS. 3 and 4. The moistened circular areas 17a to 17g—associated with the spray cones 7 of the spray nozzles 6—on the surface of the trickling filter are shown diagrammatically in FIG. 3. The surfaces 17a to 17g are not sprayed at the same time, but instead with phase displacement. The intermittent phase-displaced moistening is illustrated in FIG. 4. The seven different partial diagrams are associated with sections 17a to 17g on the surface of the trickling filter. The time is plotted on the abscissa while the volumetric flow of liquid through the spray nozzles 6 associated with the circular areas 17a to 17g is plotted on the ordinate. The rectangular pulses 18 each correspond to a spray cycle. As shown in FIG. 4, the phase displacement in the moistening of the surface 17b relative to the surface 17a is $\Delta T$. The surface 17c is moistened at a time phase-displaced by $2\Delta T$ relative to the surface 17a... by $3\Delta T$ in the case of the surface 17d, etc. The sections of the trickling filter are thus circularly (cyclically) moistened.

Figure 5:
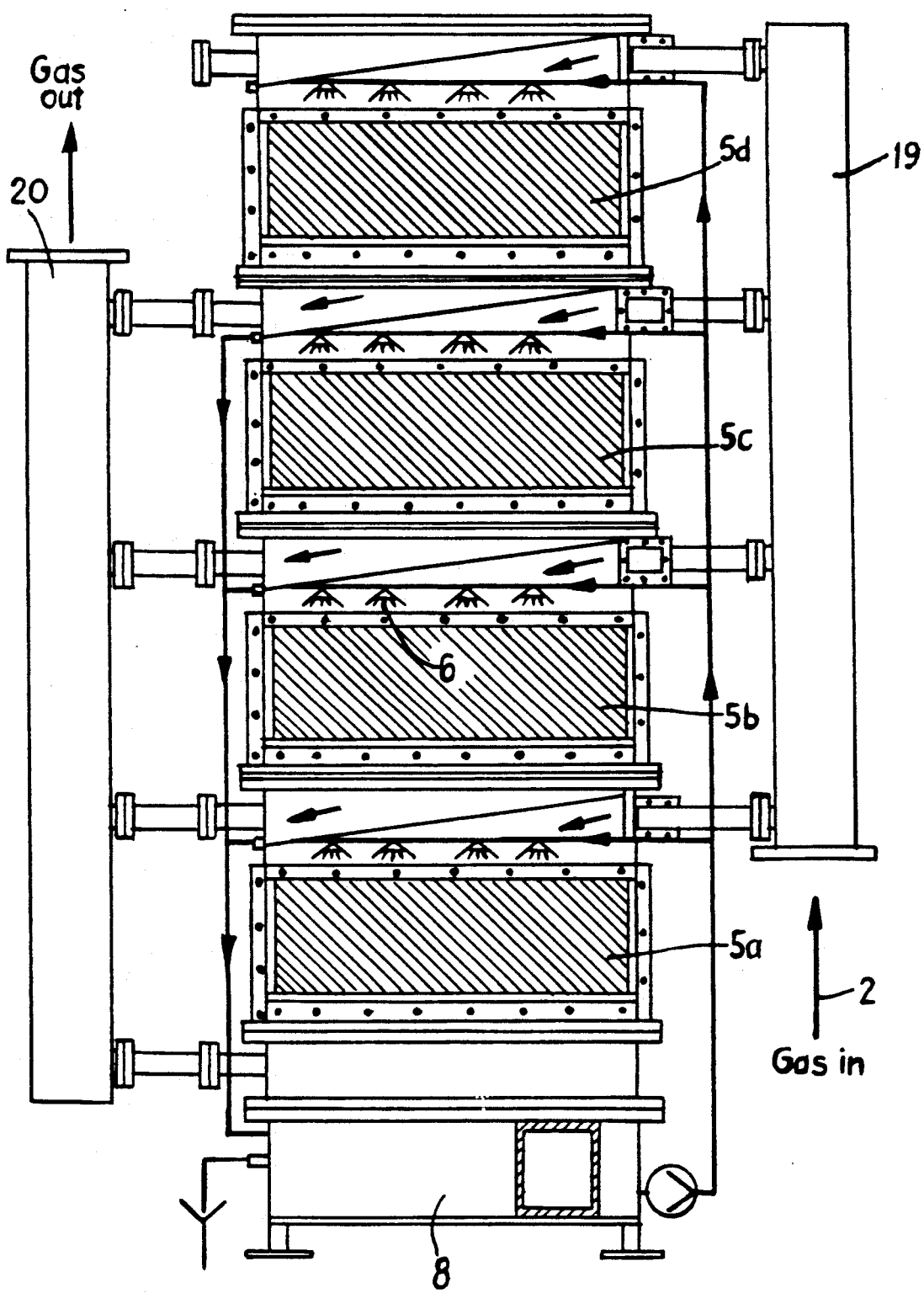
FIG. 5 shows a trickling filter tower with units arranged in parallel.

Another embodiment of a trickling filter tower which has been successfully used in the process according to the invention is shown in FIG. 5. In this case, the trickling filter does not consist of a single block, but of several blocks 5a, 5b, 5c and 5d which are arranged in parallel. The waste air stream to be purified is divided among the individual sections 5a to 5d by means of the tube distributor 19. The purified partial streams issuing at the lower end are then combined in the collecting pipe 20 and removed. In this embodiment, too, the individual sections of the trickling filter can be subjected to phase-displaced moistening. To this end, the trickling filter sections 5a to 5d are provided with separate liquid inlets and outlets. A common sump 8 is present at the bottom of the trickling filter tower. The two embodiments shown in FIG. 5 and FIG. 3 may also be combined with one another so that intermittent phase-displaced moistening takes place both in the horizontal direction and in the vertical direction.

We claim:

1. A process for the biological elimination of halogen or sulfur-containing gaseous pollutants from a waste air stream, comprising: passing the waste air stream through a moistened trickling filter, and intermittently moistening the trickling filter by repeatedly applying a liquid for moistening for a moistening period and following each moistening period with a non-moistening period when no liquid is applied for moistening.

2. A process as claimed in claim 1, wherein the trickling filter is intermittently moistened by spraying with a liquid.

3. A process as claimed in claim 1, wherein the intermittent moistening is carried out in cycles and the frequency of the moistening cycles is regulated to maintain a constant pH value of the solution flowing off from the trickling filter.

4. A process as claimed in claim 1, wherein the intermittent moistening is carried out in cycles and the frequency of the moistening cycles is regulated in dependence upon the content of carbon in any form in the gas flowing off the trickling filter.

5. A process as claimed in claim 1, wherein the trickling filter has a plurality of segments and the plurality of segments of the trickling filter are subjected to intermittent time phase-displaced moistening.

6. A process as claimed in claim 4, further comprising subjecting several trickling filters in tandem or parallel to intermittent time phase-displaced moistening.

7. A process according to claim 2, wherein the spraying is for 20 seconds to 3 minutes from 2 to 10 times per hour.

* * * * *